Dec. 17, 1963  N. LOCKMAN  3,114,378
PNEUMATIC CONTROLLER
Filed June 4, 1958
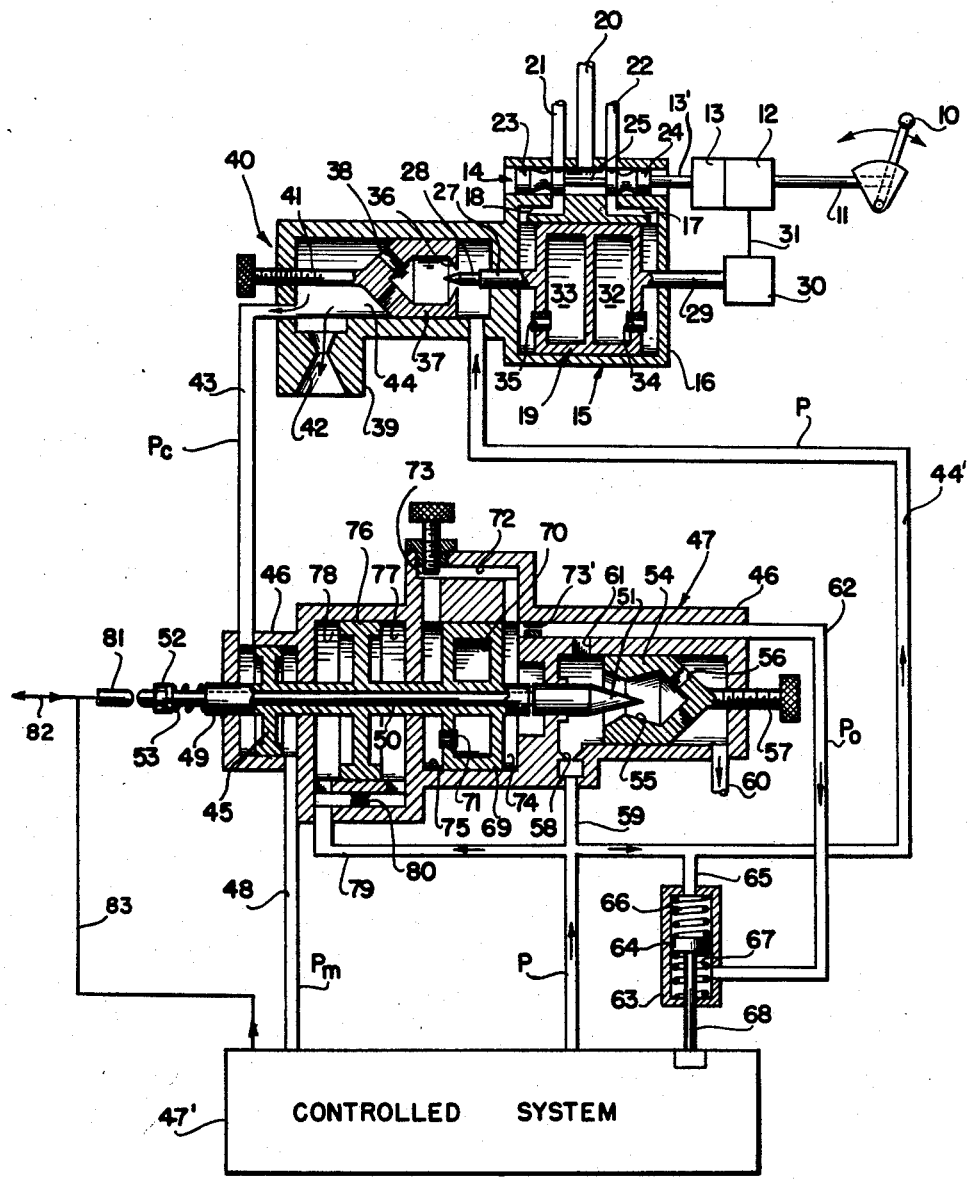
INVENTOR.
NATHAN LOCKMAN
BY R.E. Geauque
Attorney

United States Patent Office 3,114,378
Patented Dec. 17, 1963

3,114,378
PNEUMATIC CONTROLLER
Nathan Lockman, Pacific Palisades, Calif., assignor, by mesne assignments, to the United States of America as represented by the United States Atomic Energy Commission
Filed June 4, 1958, Ser. No. 739,835
2 Claims. (Cl. 137—86)

This invention relates to a pneumatic controller and more particularly to a pneumatic controller in which the error between a selected value and a measured value of a quantity representing a condition in a system is utilized to obtain a pressure output which changes the measured value to the selected value. Further, the invention relates to means for controlling the pressure output as a proportional plus integral function of the error and if desired, as a derivative function of one or more independent or inter-related variables.

At the present time, controllers for accomplishing these results are either hydraulic-mechanical or electrical in nature and under adverse environmental conditions, such as high temperature or nuclear radiation, these controllers do not operate satisfactorily. For instance, these controllers could not be utilized in the high temperature environments in aircraft flying at hypersonic speeds or could not be utilized in aircraft utilizing nuclear energy for propulsion. On the other hand, the present invention is adaptable to such environments since it utilizes air as the working fluid in the pneumatic controller and the source of air can be a ram air pressure, thus eliminating the necessity for a hydraulic pump or electrical generator.

The pneumatic controller of the present invention utilizes a pneumatic servo which receives a command input signal to produce a control pressure proportional to the selected value of a quantity in the system. The piston of the pneumatic servo contains two chambers, one of which is connected to each end of the cylinder through a restriction to provide lead stabilization in order to prevent rapid rate of change in the servo output signal. The pneumatic servo controls a pressure divider device which produces the control pressure having a value proportional to the input signal. This control pressure is compared with a pressure proportional to the actual measured value of the quantity in the system and the error between these two pressures controls the needle valve of a second pressure divider device to obtain an output pressure. Also, a feed-back piston can be connected with the needle valve to provide a proportional plus integral function of error and if desired, one or more derivative pistons can also be connected to the needle valve to add a derivative function corresponding to the rate of change of one or more independent quantities. The output pressure of the second pressure divider can serve to produce a mechanical output movement in response to the error between the desired value and the measured value and this output movement will correct the measured value so as to equal the desired value, at which time a steady state condition of the pneumatic controller results.

As an example, the pneumatic controller of the present invention can be used to control the fuel air ratio of a jet engine. In this case, the control pressure from the first pressure divider is a function of turbine discharge temperature and of compressor discharge pressure and this control pressure is compared with an actual measured pressure from the engine which is the same function of turbine discharge temperature and compressor discharge pressure. The control forces resulting from the error in in these pressures can be modified by a derivative piston which senses rate of change of compressor discharge pressure and can also be modified by the proportional plus integral force of the feedback piston. The pressure source for the second pressure divider can be compressor discharge pressure and the output pressure from the second pressure divider can be compared with the compressor discharge pressure itself to obtain an actuation output proportional to fuel-air ratio. In such a system, the command input signal will therefore vary the fuel-air ratio and cause a change in power output until the measured pressure reaches a value called for by the command input signal.

It is therefore an object of the present invention to provide a pneumatic controller in which the error between the selected value and the measured value of a quantity is sensed and an output pressure is obtained to change the measured value to the selected value.

Another object of the present invention is to provide a computer device for sensing the error between a selected value and a measured value, and for obtaining an output pressure signal which is a proportional plus integral function of the error between the desired and measured values.

Another object of the present invention is to provide a computer device for sensing the error between a selected value and a measured value, and for obtaining an output signal which is a proportional plus integral function of the error between the desired and measured values and a derivative function of one or more measured pressures.

Another object of the present invention is to provide a pneumatic controller in which the error between a selected value and the measured value of a quantity is sensed and an output pressure is obtained to change the measured value to the desired value, the output pressure being obtained from a pressure divider having a variable source pressure so that the output pressure and the source pressure can provide for an output movement which is a multiplication of the output pressure and the source pressure.

A further object of the invention is to provide a pneumatic servo having a piston with two separate compartments one compartment being connected with each end of the cylinder through a restriction in order to provide lead stabilization.

These, and other objects of the invention not specifically set forth above, will become apparent from the accompanying description and drawing which diagrammatically illustrates the pneumatic controller including the pneumatic servo and the pneumatic computer.

Referring to the drawing, the movement of a control lever 10 provides a command input signal corresponding to the selected value of a given quantity in a system. The lever 10 is pivotally connected to a shaft 11 which actuates a linear displacement transducer 12 to supply an electrical signal to a torque motor 13. The motor 13 moves shaft 13' to position a pneumatic servo valve 14 which controls the pneumatic servo 15. The pneumatic servo comprises a cylinder 16 containing passages 17 and 18 leading to opposite sides of a piston 19, and the passages 17 and 18 are connected either with the pneumatic pressure supply line 20 or to one of the exhaust lines 21, 22 by movement of the valve lands 23, 24 which are connected together by stem 25. One side of piston 19 is secured to a stem 27 which terminates in a needle valve 28 and the other side of the piston is connected with a stem 29 which positions a linear displacement transducer 30. When a pressure differential exists across the piston, the resulting force causes the piston to move until the electrical output from the transducer 30 is equal to the electrical output of the transducer 12, and when this condition is attained, torque motor 13 returns the pneumatic servo valve 14 to its null position in order to maintain the piston 19 in its new position. The transducers 12 and 30 and torque motor 13 are of standard construction and can be replaced by any suitable means for positioning servo valve 14 and providing a feedback signal proportional to the position of piston 19.

Piston 19 of the pneumatic servo contains two separate compartments 32 and 33 and these compartments are connected by restrictions 34 and 35, respectively, to opposite ends of the cylinder 16. Since the supply pressure for the servo is a pneumatic source, these compartments and restrictions provide for lead stabilization of the servo output since the chambers and restrictions provide a means of resisting rapid rate changes in the input supply pressure. Since the working fluid is compressible, the spring action of the fluid can result in rapid changes in the supply pressure. However, the compensating chambers 32 and 33 provide entrapped volumes of air which tend to oppose change in the supply pressure and resist any rapid change in this pressure. Thus, the chambers and restricters serve to damp out any tendency for rapid changes in the pneumatic pressure differential which actuates piston 19 and makes it feasible to utilize a pneumatic servo having the desired dynamic response to an input command signal.

The needle valve 28 is positioned within an orifice 36 formed at the end of a cup shaped member 37, which contains openings 38 in its side. The member 37 is contained within casing 39 of a pressure divider device 40 and is threadably conected by a stem 41 to the casing to permit adjustment of the position of the member. The casing 39 also contains a second orifice 42, and a control pressure passage 43 is connected to space 44 between the orifices 36 and 42 in order to obtain the control pressure Pc called for by the command input signal at lever 10. The orifices 36 and 42 comprise the two orifices of a pressure divider device, the operation of which is explained in United States Reissue Patent No. 24,410 granted December 31, 1957, to John A. Drake, and the value of the control pressure Pc in passage 43 is determined by the value of supply pressure P in passage 44' and the ratio of the throat areas of the orifices 36 and 42. Since movement of the needle valve 28 by the pneumatic servo 15 will vary the area of orifice 36, the control pressure Pc will be proportional to the needle valve movement resulting from a command input signal, providing the supply pressure P in passage 44' is constant. However, if the supply pressure P is variable, the ratio of the control pressure to the supply pressure will be proportional to needle position. Any single valued function of pressure ratio to needle position 28 may be generated by contouring needle valve 28.

The passage 43 connects the control pressure Pc to one side of a sensing piston 45, housed in casing 46 of a pneumatic computer device 47. The other side of the piston communicates through line 48 with a measured pressure signal Pm in the system 47' proportional to the actual value of the quantity, the selected value of which is represented by the control pressure Pc. It is understood that a suitable pressure tap can be placed in the system 47' at the location where pressure Pm exists and the tap is connected with passage 48 in a well-known manner to provide in passage 48 the measured pressure Pm. If the control pressure Pc is directly proportional to a single function, then the actual pressure in line 48 will be a measure of this single function. However, if the control pressure Pc varies with the input signal quantity and with a variable supply pressure, then the measured pressure in line 48 will be the same function of input signal and variable supply pressure. In other words, the measured pressure Pm in line 48 will be a masure of the same quantity as the control pressure Pc in line 43 regardless of the number of variables contributing to this single quantity.

The piston 45 is connected to a sleeve 49 which receives stem 50 supporting the needle valve 51. The end of the stem 50, opposite the needle valve, extends beyond sleeve 49 and carries an adjustable stop nut 52. A spring 53 is located between the end of sleeve 49 and stop nut 52 so that the stem will move with the sleeve during steady state operation with the lever 10 in fixed position. Upon movement of the input signal lever 10, a change in the control pressure Pc will result and the error between this new control pressure Pc and the measured pressure Pm in passage 48 will cause movement of the sensing piston 45 and of the needle valve 51.

A substantially cup shaped member 54 contains an orifice 55 which is varied by movement of the needle valve 51. Openings 56 are located in the side of the member 54 and a stem 57 serves to adjustably connect the member 54 to the casing 46. The casing also contains an inlet orifice 58 which receives the pneumatic supply pressure P from the line 59 and the supply fluid is discharged to the exhaust pressure through opening 60. Thus, the orifices 55 and 58 form the two orifices of a second pressure divider device similar in operation to the pressure divider device 40. A passage 61 connects the output pressure Po existing between the two orifices to an output pressure line 62 and this line connects with actuator cylinder 63 at one side of piston 64. Also, the supply pressure P to the second pressure divider is connected through passage 65 to the other side of piston 64. Thus, one side of the piston 64 receives a fraction of the supply pressure as determined by the position of needle 51 and the other side receives the full supply pressure. Springs 66 and 67 operate on opposite sides of piston 64 to provide a pressure differential on piston 64 so that the movement of output shaft 68 connected with piston 64 will be a multiple of the supply pressure P and of the ratio of the output pressure Po to P. If the supply pressure P to the orifice 58 and to the passage 65 is constant, then the output of shaft 68 will be proportional only to the position of the needle valve 51.

Referring again to the pressure computer 47, the casing 46 contains feed-back piston 69 having a central cavity 70 connected with one side of the piston through a restriction 71. Also, opposite sides of the piston are connected by a passage 72 containing a restriction 73 and the passage 72 is connected with the output pressure Po in passage 62 through a restriction 73'. The function of the feed-back piston 69 is to produce a needle valve movement which is a proportional-plus-integral function of the error existing on piston 45. If the pressure error on piston 45 produces a force to the right in the drawing, the air within space 74 at one side of piston 69 will be compressed until a pressure is developed which counteracts the error signal. Thus, the initial movement of the needle valve 51 will be proportional to the error. This pressure in space 74 will then bleed through the bleed restriction 73 to the space 75 on the opposite side of the piston. As this pressure differential tends to decrease, the resulting decrease in the unbalanced force on the feed-back piston causes the needle valve 51 to continue to move to the right, resulting in a continuous change in the output pressure Po as a function of time until the error signal across the sensing piston 45 disappears. The restriction 73' permits the output pressure Po to be utilized as a pressure source for the feed-back piston since the restrictor 73 will smooth out variations in the output pressure Po and will prevent the volume in the feed-back system from contributing a time lag to the output pressure Po. It is therefore apparent that a proportional-plus-integral function of error is provided by the feed-back piston 69 since the initial movement will be proportional to error and the following movement will be a function of time. It is understood that any source pressure could be supplied to the feed-back piston 69 to obtain the proportional-plus-integral function and that the restriction 71 and space 70 serve to resist rapid movement of the piston 69 in the event that space 75 receives rapid changes in the source pressure.

An additional piston 76 is connected to sleeve 49 between spaces 77 and 78 in casing 46. Space 78 receives the supply pressure P through passage 79 and the space 77 is connected with the supply pressure through a restriction 80. Thus, the piston 76 imparts to the sleeve 49 a force which is a derivative function of the pressure P and proportional to the rate of change of the pressure P. The pressure supply to the piston 76 could be any source pressure, the rate of change of which is desired as a compensation for the movement of the needle valve 51 and it is understood that a number of pitsons similar to 76 could be connected to sleeve 49 and supplied with a number of separate pressures, the derivative functions of which are utilized to affect the movement of needle valve 51. Without the presence of piston 76, the output pressure Po can be expressed as follows:

(1) $$Po = K\left(1 + \frac{1}{\tau S}\right)(Pc - Pm)$$

and with the presence of piston 76, the output pressure Po can be expressed as follows:

(2) $$Po = K\left(1 + \frac{1}{\tau S}\right)(Pc - Pm) + S(P)$$

where $\tau$ is an integral time constant and S is the Laplace operator. It is apparent that the second term in Equation 2 is a proportional-plus-integral function and that the third term is a derivative function.

In the above examples where the needle valve 51 moves to the right, the output pressure Po would increase so that the pressure differential on the piston 64 would decrease and cause an upward output movement of shaft 68 in order to control suitable means within the system to change the measure quantity Pm until it equalled the desired quantity Pc. If the needle valve 51 is moved to the left, the pressure Po would decrease and cause the shaft 68 to move downwardly until the measured quantity Pm is decreased to equal the selected quantity Pc. As previously stated, if a constant supply pressure in passages 59 and 65 is utilized, the moveemnt of shaft 68 would be proportional to the movement of the needle valve 51. However, if the supply pressure is a variable, the output movement of shaft 68 will be a multiple of the ratio of the output pressure Po to the supply pressure P and the supply pressure. Since the stem 50 is connected to sleeve 49 by spring 53 for movement with sleeve 49, a limit stop 81 can be positioned to engage the end of the stem 50 and thus limit the movement of the stem independently of movement of the sleeve 49. For instance, the limit stop 81 could be linearly positioned (as indicated by arrows 82) in accordance with a selected variable in system 47' through connection 83. Also, it is understood that the limit stop could be replaced by a cam engaging the end of stem 50 to control the position of needle valve 51 in accordance with any desired schedule and independently of the movement of sleeve 49. Obviously, the needle valves 28 and 51 of the two pressure dividers can be contoured in any desired manner to vary the pressure divider output pressure in a selected manner with movement of the needle valves.

When the pneumatic controller is utilized in a jet engine in the manner previously described, the source pressure P is the compressor discharge pressure and the control pressure Pc is therefore the product of compressor discharge pressure and the turbine discharge temperature selected by the command lever 10. The measured pressure Pm is obtained from a suitable device in the system whose output pressure is the same product of actual compressor discharge pressure and actual turbine discharge temperature. Since the control pressure Pc is a function of fuel flow, the output movement of shaft 68 will vary in accordance with fuel-air ratio since the compressor discharge pressure is a measure of air flow. Thus, a change in the command input signal will cause a selected change in fuel-air ratio to vary the output of the engine.

The pneumatic controller of the present invention thus provides a device for utilizing an input command signal to select a desired quantity within a system and this quantity is compared with an actual measured quantity. The error in these two quantities is utilized to obtain a pressure output for changing the measured quantity until it equals the selected quantity. This output can be a proportional-plus-integral function of the error and by the addition of derivative pistons, such as piston 76, can also be a derivative function of a number of other secondary signals. Various modifications, than those mentioned herein, are contemplated by those skilled in the art without departing from the spirit and scope of the persent invention as hereinafter defined by the appended claims.

What is claimed is:

1. A pneumatic controller comprising a cylinder containing a sensing piston connected with a first pressure on one side and with a second pressure on the other side in order to develop a control force proportional to the difference in said pressures, a control shaft connected with said sensing piston and terminating in a needle valve, a pressure divider comprising a flow path having an inlet and an outlet orifice with a space inbetween, a passage connected with said space intermediate said orifices for obtaining an output pressure, a variable pneumatic pressure source connected with said flow path upstream of said inlet orifice, said needle valve being located in one of said orifices to vary the area thereof and said output pressure as a function of needle valve position, a feed-back piston connected with said control shaft and located in a cylinder, a conduit for introducing compressible fluid to said cylinder, said conduit being connected to said passage and containing a restrictor for isolating said cylinder from variations in said output pressure resulting from variations in said pneumatic pressure source, passage means for connecting the opposite ends of said cylinder, and a bleed restriction in said passage means for providing a feed-back piston force on said control shaft which is a proportional-plus-integral function of the difference in said first and second pressures, a derivative piston connected with said control shaft and located within a second cylinder, conduit means for connecting one side of said derivative piston directly to said source pressure and a restrictor for connecting said conduit means to the other side of said derivative piston so that the force exerted on said control shaft by said derivative piston is a derivative function of said source pressure determined by the rate of change in said source pressure.

2. A pneumatic controller as defined in claim 1 wherein said source pressure is obtained from a system under control of said output pressure, said pressure source comprising an available pressure in said system connected both with said inlet orifice and with said conduit means leading to said second cylinder.

References Cited in the file of this patent

UNITED STATES PATENTS

| | | |
|---|---|---|
| 2,225,518 | Blasig | Dec. 17, 1940 |
| 2,457,595 | Orr | Dec. 28, 1948 |
| 2,541,464 | Davies | Feb. 13, 1951 |
| 2,712,321 | Grogan | July 5, 1955 |
| 2,767,725 | Long | Oct. 23, 1956 |
| 2,775,231 | Silver | Dec. 25, 1956 |
| 2,864,393 | Drake | Dec. 16, 1958 |
| 2,918,337 | Kapitula | Dec. 22, 1959 |